United States Patent [19]
Lasiter

[11] Patent Number: 5,148,607
[45] Date of Patent: Sep. 22, 1992

[54] FISH HOLDING AND MEASURING DEVICE AND METHOD OF USE

[76] Inventor: Rupert W. Lasiter, Rte. 1, Box 1368, Elkhart, Tex. 75839

[21] Appl. No.: 786,287

[22] Filed: Nov. 1, 1991

[51] Int. Cl.[5] .......................... G01B 5/02; A01K 97/00; B43L 7/00; B65D 85/00
[52] U.S. Cl. ........................................... 33/549; 33/485; 43/4; 43/54.1; 206/315.11
[58] Field of Search ................. 33/549, 568, 573, 483, 33/484, 485, 494; 43/4, 54.1; 206/0.8, 0.81, 315.11, 563

[56] References Cited

U.S. PATENT DOCUMENTS

| | | | |
|---|---|---|---|
| 461,106 | 10/1891 | Oberly | 33/494 |
| 1,130,978 | 3/1915 | Jackson | 206/0.8 |
| 1,964,425 | 6/1934 | Bowman | 33/485 |
| 2,880,545 | 4/1959 | Stadler | 43/4 |
| 2,952,369 | 9/1960 | Rew | 206/0.8 |
| 3,085,378 | 4/1963 | Howard | 206/0.8 |
| 3,171,566 | 3/1965 | Mitchell | 43/54.1 |
| 3,259,988 | 7/1966 | Lunn | 33/549 |
| 4,679,691 | 7/1987 | Halloran | 206/0.8 |
| 4,839,675 | 6/1989 | Owen | 206/315.11 |
| 5,097,617 | 3/1992 | Craven | 33/485 |

Primary Examiner—William A. Cuchlinski, Jr.
Assistant Examiner—C. W. Fulton
Attorney, Agent, or Firm—Ronald B. Sefrna

[57] ABSTRACT

A device for simultaneously holding and measuring the length of a fish, generally comprising a rectangular tray open at one end, the tray having a bottom, two side walls and one end wall, and a preferably hinged lid with a releasable latch. The length of the tray is made equal to the minimum legal length established for the type of fish with which the device is to be used. The length of the lid is less than the length of the bottom of the tray and the lid is disposed on the tray with one end of the lid generally aligned with the closed end of the tray, such that a portion of the bottom of the tray adjacent to the open end is not covered by the lid. A fish is placed in the device with its nose against the end wall at the closed end of the tray, and the lid is closed to loosely retain the fish the device. If the tail of the fish extends outwardly beyond the open end of the tray the fish is of legal size and may be retained by the fisherman.

19 Claims, 3 Drawing Sheets

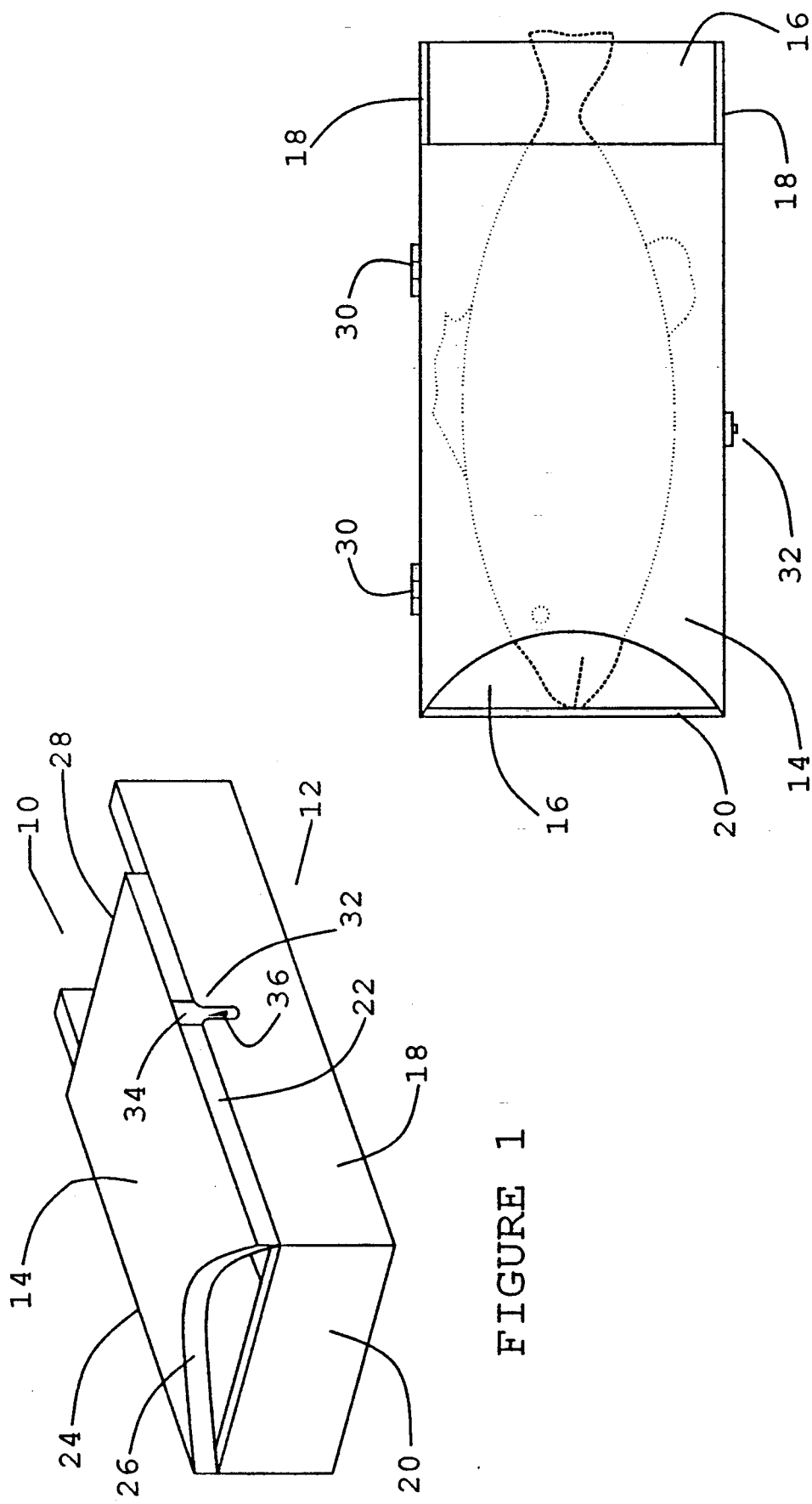

FISH HOLDING AND MEASURING DEVICE AND METHOD OF USE

FIELD OF THE INVENTION

The present invention generally relates to devices for measuring the length of a fish, and in its preferred embodiments more specifically relates to a device for simultaneously holding and measuring the length of a fish.

BACKGROUND OF THE INVENTION

It is becoming increasingly common for states and other governmental units to impose size limits on fish taken from bodies of water, establishing the minimum length of fish of particular species that may legally be kept by sport fishermen. For example, the State of Texas has established ten inches as the minimum length for Crappie and Sand Bass. As a result of the regulatory limitations, it is necessary for fishermen to measure the fish they catch to determine whether they exceed the minimum length and may be retained, or whether they fall short of the minimum length and must be returned to the water. Obtaining an accurate measurement of a freshly caught, active fish is difficult. The measuring process may also involve risk of injury for the fisherman, from fin punctures and/or cuts, and also involves risk of external and internal injury to the fish, from the rough handling that is often required to restrain the fish during the measuring process.

Various approaches to measuring fish are known in the prior art, but each of the known approaches suffers from certain problems and disadvantages. One common approach is to use a general measuring device, such as a yardstick or tape measure. In this approach the fisherman must simultaneouly hold both the fish and the measuring device, properly position the fish relative to the measuring device, and read the length of the fish from the markings on the measuring device while holding the fish in the proper position. In addition to the mechanical difficulty of simultaneously holding, positioning, and measuring, this approach has the serious disadvantages of leading to inaccurate measurements and of exposing both fisherman and fish to injury.

In a related approach a measuring device is attached to a boat or other structure, and the fish is positioned on the fixed measuring device. While this approach alleviates some of the problems associated with the use of a loose measuring device, it remains subject to several inherent disadvantages. It is still necessary for the fisherman to hold and restrain the fish during the measuring process and to properly position the fish against the measuring device, and the increase in accuracy and reduction in risk of injury to both fisherman and fish are marginal.

The prior art also includes measuring devices formed in a dished configuration, with a depression intended to receive the body of the fish during the measuring process. Although the configuration of devices representing this approach makes it somewhat less difficult to restrain and properly position the fish, it is still necessary for the fisherman to manipulate both the measuring device and the fish at the same time. Further, since the fish must be directly handled and restrained by the fisherman, the risks of injury are only slightly reduced.

A further effort to address the identified problems and disadvantages is illustrated by U.S. Pat. No. 3,259,988 to Lunn, which discloses a holding and measuring device generally comprising a hollow tubular body closed at one end and including a length scale. A fish is placed in the interior of the device with its nose against the closed end, and the length is determined from the scale. Although the approach characterized by the described device allows a fisherman to determine the length of a fish without the need to simultaneously hold and position the fish against a measuring device, it still requires relatively extensive handling of the fish before it can be measured. The hook must be removed from the mouth of the fish, and then the fish must be inserted into the interior of the device through an opening not significantly larger than the fish itself. The risks of injury associated with such handling are not addressed by the illustrated approach. Further, with the fish fully within the interior of the device, the fisherman is not able to grasp and straighten the tail to obtain accurate length measurement.

Therefore, there remains a need for a fish holding and measuring device, and for a method of measuring the length of a fish, which fully address and solve the problems and disadvantages associated with the approaches known in the prior art. Accordingly, it is among the objectives of the present invention to provide a fish holding and measuring device which allows a fish to be restrained and measured with minimal handling of the fish by the fisherman. It is further among the objectives of the invention to provide a device which allows a fisherman to easily and positively determine whether a fish exceeds a certain minimum length even in conditions of limited visibility. It is also among the objectives of the invention to provide a method of quickly and accurately determining the length of a fish.

SUMMARY OF THE INVENTION

The present invention provides a device designed to securely hold a freshly caught fish and allow a fisherman to easily determine whether the fish exceeds the minimum length, and further provides a method of using such a device.

In its preferred embodiment, the fish holding and measuring device of the invention comprises a relatively shallow, three-sided rectangular tray, having a bottom, two side walls, and one end wall. The side walls and the end wall are interconnected to the bottom of the tray component with the end wall interconnected between the two side walls so as to leave one of the narrow ends of the tray open. The length of the tray, from the inner surface of the end wall at the closed end of the tray to the opposite end of the bottom of the tray is equal to the minimum length of the fish the device is to be used to measure. The width of the tray is adapted to generally match the width to length proportions of the species of fish with which the device is to be used, so that a fish of that species, with a length generally the same as the length of the tray, will be loosely retained in the tray in general alignment with the longitudinal axis of the tray. The height of the side walls of the tray are adapted in a similar manner, to be slightly greater than the thickness of the fish with which the device is to be used.

The device further comprises a lid, preferably connected to one of the longer side walls by a hinge, covering the majority of the open top of the tray portion of the device. The length of the lid is shorter than the length of the tray, and the width of the lid is equal to the width of the tray. It is preferred that the device also include a latch mechanism for releasably latching the lid in a closed position over the tray.

The lid is disposed on the tray with one end of the lid generally aligned with the closed end of the tray, so that the lid ends short of the open end of the tray. The end of the lid at the closed end of the tray is cut away, exposing a portion of the interior of the tray at its closed end.

When a fish is caught and the fisherman desires to measure the length of the fish, the device is used by opening the lid, placing the fish in the tray with its nose toward the closed end of the tray, and then closing the lid to loosely retain the fish within the interior of the device. The cut-out in the lid provides a finger space to facilitate positioning the fish, and also allows the fisherman to visually determine the position of the nose of the fish. The device may be tilted to ensure that the nose of the fish is against the inner surface of the side wall at the closed end of the tray. Since the length of the tray is equal to the minimum length required for the fisherman to keep the fish, if the tail of the fish extends to or past the end of the tray, the fish may be kept. Conversely, if the tail of the fish does not reach the end of the tray, the fish must be returned to the water. The lid is designed to end short of the open end of the tray to facilitate grasping and holding down the tail of the fish, and to facilitate visual determination of the length. When the length of the fish is determined, the fish may be removed from the device by tilting the device to lower the open end, allowing the fish to slide from the interior of the device to an ice chest or other container or back to the body of water from which it was caught.

With the device of the invention, a fisherman may accurately determine whether a freshly caught fish is of legal length with only very minimal handling of the fish. In most cases it is not even necessary to remove the hook from the mouth of the fish before the fish is placed in the device. Further, because the length of the fish relative to the length of the tray component of the device is the determining factor, it is not necessary for the fisherman to read a length scale and the device may be effectively used in almost complete darkness. When the measurement is completed, the lid of the device may be opened and the fish left in the tray component to facilitate restraint while, for example, the hook is removed, further reducing the risk of injury to fisherman and fish resulting from handling.

The device of the invention may be provided in several different models, each dimensioned to accommodate a particular species of fish and a particular minimum length. Alternatively, the device may be made adjustable, so that a single device may be used to measure a variety of species of fish. For example, the bottom of the tray may be enlarged in either or both width and length, with the long opposed side walls made adjustable to vary the space between them. The device may include either a fixed or an adjustable extension, and/or tray may be marked with clearly visible indicia along its length to define various lengths, so that the fisherman can compare the length of a fish to the appropriate length indicia for that species. The height of the side walls of the tray may be made sufficiently large to accommodate the thickness of a number of fish species, and the lid may be provided with means to firmly retain fish of varying thicknesses without physically damaging the fish.

These and other features and alternative embodiments will be described in more detail with reference to the accompanying drawing figures.

BRIEF DESCRIPTION OF THE DRAWINGS

FIG. 1 is a perspective view of the preferred embodiment of the device of the invention.

FIG. 2 is a top view of the preferred embodiment of the device of the invention, with a fish retained within the interior thereof.

DETAILED DESCRIPTION OF THE INVENTION

Figure 3:
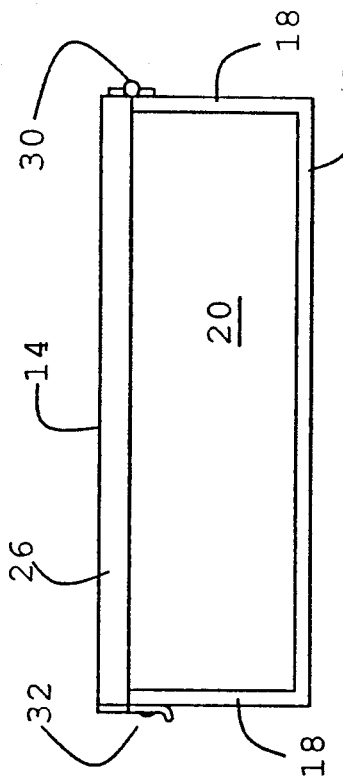
FIG. 3 is a side view of the preferred embodiment of the device of the invention.
Figure 4:
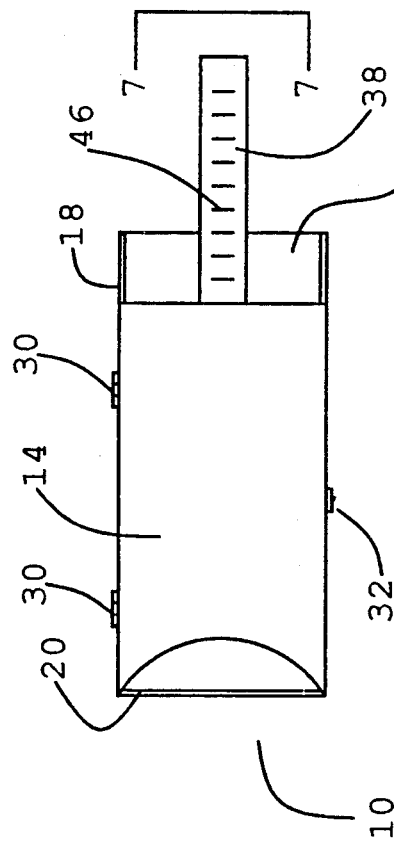
FIG. 4 is an end view of the preferred embodiment of the device of the invention, from the open end thereof.
Figure 5:
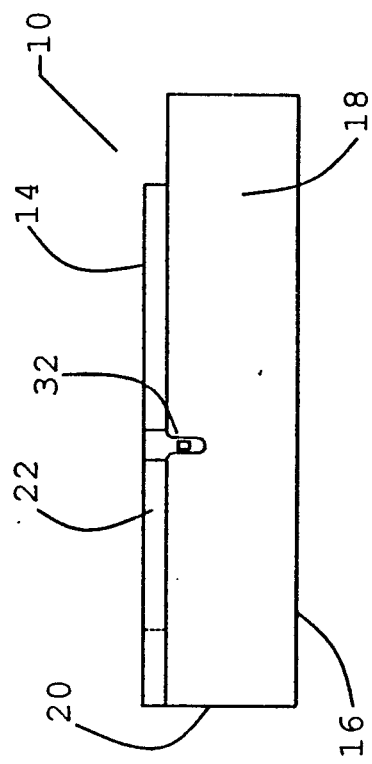
FIG. 5 is a top view of a first alternative embodiment of the device of the invention.

Referring now to the drawings, the preferred embodiment of the fish holding and measuring device of the invention, generally designated by reference numeral 10, is illustrated in FIGS. 1 through 4. Device 10 generally comprises a tray 12 and a lid 14. Tray 12 includes bottom 16, identical side walls 18, and end wall 20. In the preferred embodiment, bottom 16 is of planar rectangular configuration. Side walls 18 are interconnected to bottom 16 in opposed, parallel relation at the longer edges of bottom 16, and extend upwardly therefrom perpendicular to the plane of bottom 16. End wall 20 is interconnected between adjacent ends of side walls 18 and is also interconnected to bottom 16 at one of the shorter edges thereof. Each of side walls 18 extends the full length of bottom 16 and end wall 20 extends across the full width of bottom 16 to form an open topped enclosure open at one end. The height of side walls 18 and end wall 20 from bottom 16 is equal, so that the upper edges of walls 18 and 20 define a plane parallel to the plane of bottom 16.

In the preferred embodiment lid 14 comprises a rectangular planar member having opposed long edges 22 and 24, and opposed ends 26 and 28. The width of lid 14 between edges 22 and 24 is approximately equal to the distance between the outer faces of side walls 18, and the length of lid 14 is less than the length of bottom 16. Lid 14 is disposed over tray 12 upon the upper edges of side walls 18 and end wall 20, and with the ends of edges 22 and 24 adjacent to end 26 generally aligned with end wall 20. Lid 14 is preferably pivotally interconnected to tray 12 by hinge means 30. As shown in the drawing figures, hinge means 30 are connected between edge 24 of lid 14 and the associated side wall 18, through it will be understood that the pivotal connection may be made between edge 22 of lid 14 and the associated side wall 18 as a matter of choice within the scope of the invention. Similarly, lid 14 could be pivotally connected to end wall 20 of tray 12 if desired, but such an arrangement would limit the efficiency and effectiveness of device 10 and is not preferred. Hinge means 30 may comprise one or more conventional hinges as illustrated in the drawing figures, or may comprise a unitary hinge formed during the construction of device 10.

It is preferred that device 10 further include latching means 32 for securing lid 14 in a closed position relative to tray 12. In the preferred embodiment, latching means 32 is designed to automatically latch as lid 14 is closed upon tray 12 so as to avoid the need for a fisherman to independently latch lid 14 in a closed position. As illustrated in the drawing figures, latching means 32 is configured with a shape retentive hasp 34 and a latch post 36 to be received through an aperture in hasp 34, so that as lid 14 is closed hasp 34 slides over latch post 36 until latch post 36 aligns with and is received in the aperture in hasp 34. However, it will be understood that any convenient latching means which achieves the desired function may be utilized within the scope of the invention.

End 26 of lid 14, associated with the closed end of tray 12, is preferably curved toward the interior of lid 14, as illustrated in FIGS. 1, 2, 5, and 6, providing an opening into the interior of tray 12 through lid 14 at end 26. Such opening allows visual inspection of the position of a fish within the interior of device 10 with lid 14 closed, so that a fisherman can readily verify that the nose of a fish is against end wall 20, and further allows a fisherman to reach into the closed end of the interior of device 10 with lid 14 closed to adjust the position of a hook or adjust the position of the nose of a fish if necessary to obtain an accurate length measurement. The dimensions of such opening should be sufficiently large to readily allow visual inspection and access, but not so large as to allow a fish to pass through the opening and escape from the interior of device 10. Although it is preferred that end 26 of lid 14 be curved to create the described opening, thus limiting the area through which a fish might escape, it will be understood that end 26 may be formed with other configurations. For example, end 26 could be constructed with an angular configuration to form a triangular opening. It will be further understood that lid 14 could be formed with end 26 extending straight between edges 22 and 24, and the described opening provided by positioning lid 14 on tray 12 such that end 26 is separated from end wall 20 toward the open end of tray 12.

The length of tray 12 from the inner surface of end wall 20 to the end of bottom 16 at the open end of tray 12 is equal to the minimum length of the particular type or species of fish with which a particular model of device 10 is to be used. For example, if the minimum legal length requirement for keeping fish of a particular species is set at ten inches, the interior of device 10 to be used to measure that fish species will also be ten inches. The width and depth of tray 12 are proportioned to generally match the proportions of the selected fish species, so that a fish of that species having a length approximately equal to the interior length of tray 12 will easily fit within the interior of tray 12, with lid 14 closed, without excessive gap between the body of the fish and the inner surfaces of device 10. The preferred proportions are selected such that a fish retained within the interior of device 10 is prevented from significant movement, but is not so tightly retained as to cause injury to the fish.

For some fish species both minimum and maximum length limits are applicable to a determination of whether an individual fish may be kept or must be returned to the water, such that only fish longer than the minimum but shorter than the maximum may be kept. An alternative embodiment of device 10, illustrated in FIG. 5, may be used to accommodate such a situation. In the illustrated alternative embodiment, bottom 16 of tray 12 is provided with extension 38, extending beyond the end of bottom 16 at the open end of tray 12 with its longitudinal axis parallel to the longitudinal axis of bottom 16. The distance from the inner surface of end wall 20 to the end of bottom 16 at the open end of tray 12 is set at the minimum length for the selected fish species, and the distance from the inner surface of end wall 20 to the outer end of extension 38 is set at the maximum length.

Figure 6:
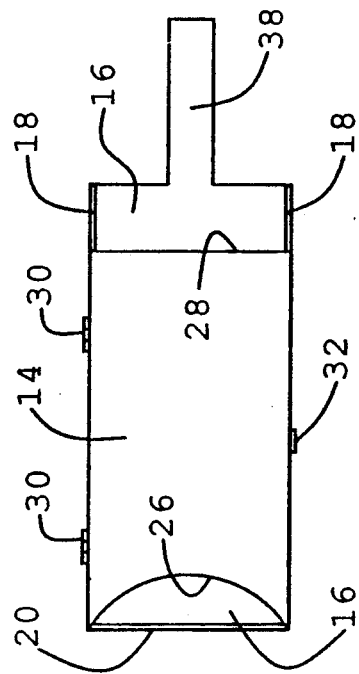
FIG. 6 is a top view of a second alternative embodiment of the device of the invention.
Figure 7:
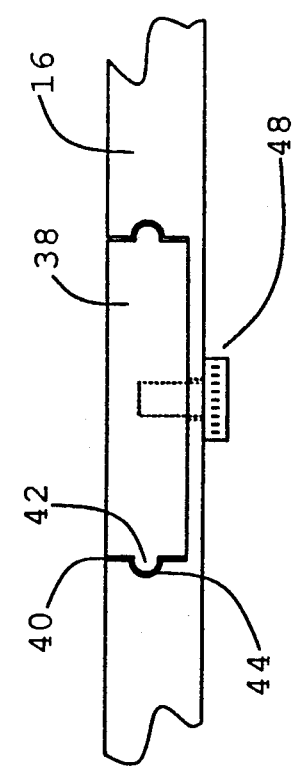
FIG. 7 is an end view detail of the alternative embodiment illustrated in FIG. 6, along line 7—7 of FIG. 6.

Device 10 may be adapted for use with varying length requirements through a second alternative embodiment, illustrated in FIGS. 6 and 7, including an extension 38 that is adjustable relative to bottom 16. Extension 38 is formed as an elongate rectangular bar which is received in a slot 40 in bottom 16. Extension 38 is retained in slot 40 by, e.g., interlocking lobes and grooves 42 and 44, respectively, and is allowed to move parallel to the longitudinal axis of bottom 16 in slot 40. Extension 38 preferably includes a length scale 46 on its upper surface, and may be held in a selected position by any convenient clamping or indexing means, such as clamp screw 48 shown in FIG. 7.

Figure 8:
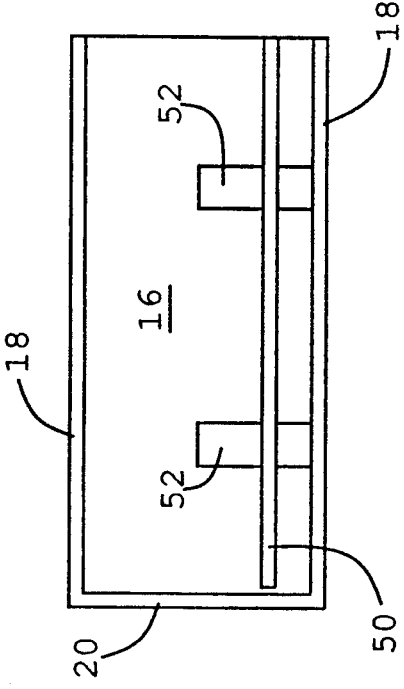
FIG. 8 is a top view of the tray component of an alternative embodiment of the device of the invention showing an adjustable wall for changing the effective width of the tray.

The effective width of the interior of tray 12 may also be made adjustable in a further alternative embodiment so that the proportions of tray 12 can be adjusted to fit the proportions of a particular fish species device 10 is to be used to measure. As illustrated in FIG. 8, tray 12 includes an adjustable wall 50 disposed parallel to side walls 18 and moveable across the width of bottom 16. Wall 50 includes lobes near its lower edge, to be received in slots 52 in bottom 16 to retain wall 50. Clamping means, such as described above and illustrated for use with adjustable extension 38, are provided to set the position of wall 50.

Figure 10:
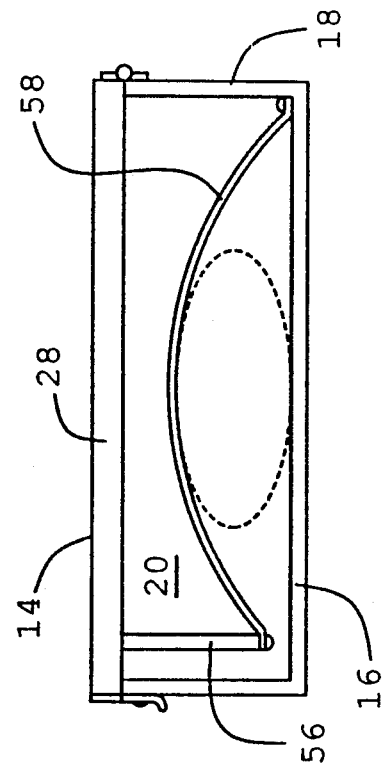
FIG. 10 is an end view of the device of the invention illustrating another alternative embodiment of the lid component, and including an illustration of the cross-sectional configuration of the body of a fish retained in the device.
Figure 9:
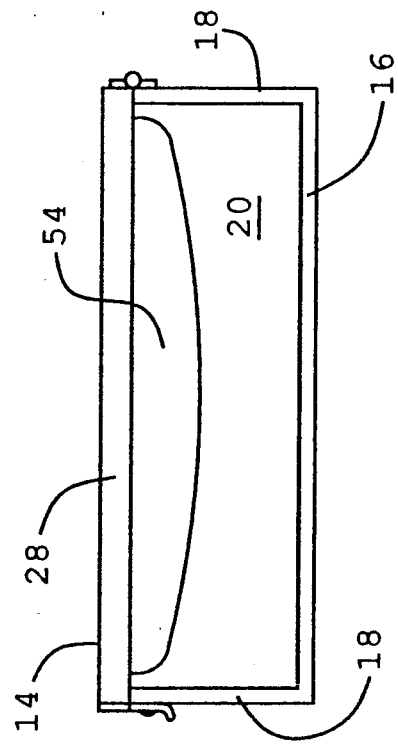
FIG. 9 is an end view of the device of the invention illustrating an alternative embodiment of the lid component.

Device 10 may also be adapted to receive and hold fish with different body thicknesses by including a resilient fish retaining means such as those illustrated in FIGS. 9 and 10. The height of side walls 18 and end wall 20 may be increased, thus increasing the depth of tray 12, and a resilient pad 54 may be interconnected to the lower face of lid 14 to extend into the interior of device 10, as shown in FIG. 9. If the body thickness of a fish placed in device 10 is greater than the distance between pad 54 and bottom 16, pad 54 will compress as lid 14 is closed, firmly but gently retaining the fish in device 10. In another approach, shown in FIG. 10, one or more band retainers 56 extend downward from the lower face of lid 14 and one or more elastic bands 58 are connected between band retainers 56 and bottom 16. When a fish is placed in tray 12 and lid 14 is closed, bands 58 contact the body of the fish to gently retain it against bottom 16.

It is preferred that device 10 be constructed of plastic material by a molding process. Tray 12 and lid 14 may be formed as a unitary construction with a "self hinge"

to allow lid 14 to pivot relative to tray 12, or tray 12 and lid 14 may be formed as separate components and then pivotally interconnected. However, it will be understood that device 10 may be constructed of any suitable material, such as wood or metal.

Device 10 allows a fisherman to very quickly and easily determine whether a fish is of sufficient length to keep. When a freshly caught fish is pulled from the water, the fisherman opens lid 14, places the fish in tray 12, and closes lid 14 to enclose the fish in the interior of device 10. In most cases it is not necessary for the fisherman to first remove the hook from the mouth of the fish, since the hook can be moved to one side of the fish's mouth and will not interfere with placement of its nose against end wall 20, so the fisherman can use one hand to grasp the fishing line and place the fish in tray 12 while using the other hand to close lid 14, not even touching the fish. The fishing line extends through the opening between end 26 of lid 14 and end wall 20. If necessary, device 10 is tilted so that the fish slides over bottom 16 until its nose is against end wall 20. The fisherman can then immediately determine whether the fish is of legal length by simply determining whether the tail of the fish extends to or past the end of bottom 16 at the open end of tray 12, or the end of adjustable extension 38, if used. If the length limitations include maximum as well as minimum length criteria and the appropriate alternative embodiment of device 10 is used, the fisherman need only determine whether the end of the tail falls between the end of bottom 16 and extension 38. The space between end 28 of lid 14 and the adjacent end of bottom 16 allows the fisherman to easily grasp the tail of the fish to facilitate measurement. After the length measurement is made the fish is removed from device 10 and either kept or returned to the water. The fish may be removed from device 10 by opening lid 14 or by lowering the open end of the device and allowing the fish to slide from the interior.

The foregoing descriptions of the device and method of the invention are illustrative and not for limitation. Additional modifications and alternative embodiments may be made without departing from the scope of the invention as claimed.

What is claimed is

1. A fish holding and measuring device, comprising a tray having a bottom with first and second edges, first and second ends, an upper face, and a lower face, having a pair of side walls, each with a lower edge and an upper edge, each of said side walls interconnected at its lower edge to and extending upwardly from said upper face of said bottom with one of said side walls disposed at said first edge and the other of said side walls disposed at said second edge, and having an end wall interconnected to and extending upwardly from said upper face of said bottom, with said end wall disposed at said first end of said bottom, and with said end wall extending between and interconnected to said side walls; and a lid, with first and second edges and first and second ends, the width of said lid between said first and second edges thereof being approximately equal to the distance between said upper edges of said side walls and the length of said lid being less than the distance between said first and second ends of said tray, said lid being disposed over said tray upon said upper edges of said side walls and pivotally interconnected to said tray, said lid being positioned relative to said tray such that said first end of said lid is disposed toward said second end of said bottom from said end wall, so as to provide an access space to the interior of said tray between said first end of said lid and said end wall.

2. The fish holding and measuring device of Claim 1, wherein said second end of said lid is disposed between said second end of said bottom of said tray and said first end of said bottom of said tray.

3. The fish holding and measuring device of claim 1, wherein said lid includes a cut-out at said first end thereof, and wherein said lid is disposed on said tray with the ends of said first and second edges at said first end of said lid aligned with said end wall of said tray.

4. The fish holding and measuring device of claim 1, further comprising latch means to releasably latch said lid in a closed position on said tray.

5. The fish holding and measuring device of Claim 4, wherein said latch means automatically engages to latch said lid in a closed position on said tray when said lid is closed.

6. The fish holding and measuring device of Claim 1, wherein said pivotal interconnection of said lid to said tray is between one of said edges of said lid and one of said side walls of said tray.

7. The fish holding and measuring device of Claim 1, wherein said bottom of said tray is substantially planar and rectangular in configuration, wherein each of said side walls and said end wall are substantially planar and rectangular in configuration and extend upwardly from said bottom in generally perpendicular relation thereto, and wherein said lid is substantially planar.

8. The fish holding and measuring device of Claim 1, wherein said first and second side walls extend along substantially the full length of said respective first and second edges of said bottom.

9. The fish holding and measuring device of Claim 1, wherein said bottom of said tray has a longitudinal axis and said second end of said bottom is perpendicular to said longitudinal axis.

10. The fish holding and measuring device of Claim 1, wherein said bottom of said tray has a longitudinal axis, and wherein the device further comprises an elongate extension member with first and second ends, interconnected at its first end to said second end of said bottom and extending outwardly therefrom generally parallel to said longitudinal axis.

11. The fish holding and measuring device of Claim 10, wherein said extension member is moveably interconnected to said bottom such that the position of said extension member relative to said bottom is adjustable generally along the longitudinal axis of said bottom to vary the distance between said second end of said bottom and said second end of said extension member.

12. The fish holding and measuring device of claim 1, wherein at least one of said side walls of said tray is moveably interconnected to said bottom such that the distance between said side walls across the width of said bottom is adjustable.

13. The fish holding and measuring device of claim 1, further comprising resilient retaining means for retaining a fish against said bottom of said tray.

14. The fish holding and measuring device of claim 13, wherein said lid has an upper face and a lower face and wherein retaining means comprises a resilient pad interconnected to said lower face of said lid.

15. The fish holding and measuring device of claim 13, wherein said retaining means comprises one or more elastic bands, with first and second ends, interconnected at said first end to said lid and interconnected at said second end in the interior of said tray, such that said one or more elastic bands extend substantially across the width of said tray.

16. A fish holding and measuring device, comprising
   a tray having a substantially planar bottom of rectangular configuration with first and second edges, first and second ends, an upper face and a lower face, having a pair of substantially planar side walls of rectangular configuration, each with upper and lower edges, first and second ends, an inner face and an outer face, each of said side walls interconnected at its lower edge to said bottom at a different one of said edges thereof with the first end of each of said side walls aligned with said first end of said bottom, and extending upwardly therefrom with the planes of said walls generally perpendicular to the plane of said bottom, and having one substantially planar end wall of rectangular configuration with an upper edge and a lower edge, first and second ends, an inner face and an outer face, said end wall interconnected at its lower edge to said bottom at said first end thereof and extending upwardly therefrom with the plane of said end wall generally perpendicular to the plane of said bottom, and said side wall interconnected at its ends to said side walls at said first ends thereof;
   a substantially planar lid with first and second edges, first and second ends, an upper face and a lower face, having a cut-out at said first end thereof, said lid disposed on said tray in generally parallel relation to said bottom and pivotally interconnected to said tray between one of said edges of said lid and one of said side walls of said tray such that said lid may be rotated relative to said tray about such pivotal interconnection, said lid positioned relative to said tray so as to provide a passage to the interior of said tray adjacent to said end wall thereof through said cut-out with said lid closed upon said tray; and
   latch means for releasably latching said lid in a closed position upon said tray.

17. The fish holding and measuring device of claim 16, wherein said latch means automatically engages upon closure of said lid to latch said lid in a closed position upon said tray.

18. A method of holding and measuring the length of a fish relative to a preselected length, using a fish holding and measuring device having an open topped tray with a bottom, the tray enclosed on two sides and one end and open at the opposite end, with the length of the tray set at such preselected length, and having a lid disposed over the top of the tray and pivotally interconnected to the tray, comprising the steps of
   opening the lid of the fish holding and measuring device;
   placing the fish to be held and measured in the tray with one side of the fish against the bottom of the tray and with the nose of the fish toward the closed end of the tray;
   closing the lid upon the tray to retain the fish in the tray;
   adjusting the position of the fish in the tray, as necessary, such that the nose of the fish is against the closed end of the tray;
   determining whether the tail of the fish extends past, or ends short of, the open end of the tray, thereby determining whether the fish is respectively longer than or shorter than the preselected length; and
   removing the fish from the device.

19. The method of claim 18, wherein the length of the fish is to be measured relative to a first preselected length and a second preselected length, wherein the fish holding and measuring device further has an extension member extending outwardly from the bottom of the tray at the open end of the tray, with the length of the bottom of the tray equal to the first preselected length and with the length of the bottom of the tray plus the length of the extension member equal to the second preselected length, wherein the step of determining whether the tail of the fish extends past or ends short of the open end of the tray determines whether the fish is respectively longer than or shorter than the first preselected length, and wherein the method comprises the additional step of
   if the tail of the fish extends past the open end of the tray, then determining whether the tail of the fish extends past or ends short of the outer end of the extension member, thereby determining whether the length of the fish is between the first preselected length and the second preselected length or is greater than the second preselected length.

* * * * *